April 22, 1952 D. W. KELBEL 2,593,568
TRANSMISSION
Filed March 2, 1946 2 SHEETS—SHEET 1

Inventor:
Donald W. Kelbel
By Edward C. Fritzlaugh
Atty.

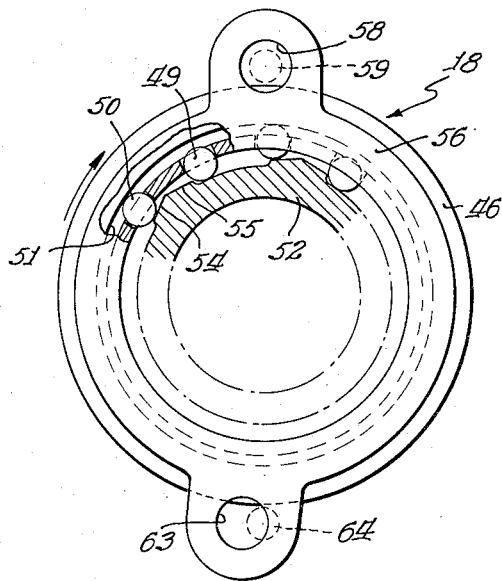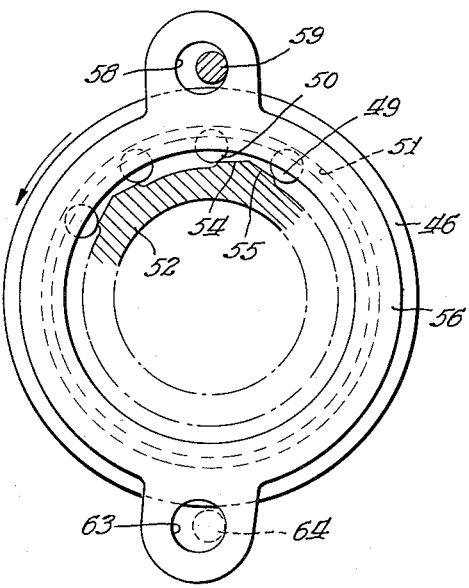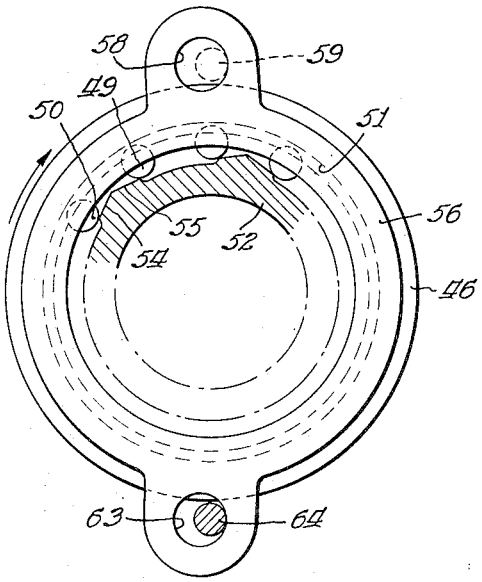

Patented Apr. 22, 1952

2,593,568

UNITED STATES PATENT OFFICE 2,593,568

TRANSMISSION

Donald W. Kelbel, Muncie, Ind., assignor to Borg-Warner Corporation, Chicago, Ill., a corporation of Illinois Application March 2, 1946, Serial No. 651,448

11 Claims. (Cl. 74—759)

My invention relates to transmissions and more specifically to transmissions particularly adapted for use in automotive vehicles.

It is an object of my invention to provide an improved transmission which is of such construction that it may be easily controlled.

More particularly it is an object of my invention to provide an improved braking means in such a transmission for completing a power train therethrough which is adapted to automatically engage for both relative directions of rotation of the parts associated with the braking means which are adapted to engage with respect to each other and which braking means furthermore has a neutral condition. It is a more specific object to provide such an improved braking means in a transmission which comprises two sets of rollers, one set being operative for one relative direction of rotation between the parts and the other set being operative for the other relative direction of rotation between the parts. It is contemplated that the rollers shall preferably be controlled by means of a roller cage and that the cage shall be so controllable that either one of the sets of rollers shall be prevented, according to the wishes of the operator, from engaging for thereby neutralizing the braking means as far as that particular set of rollers is concerned.

It is more particularly an object to utilize the braking means as a brake for a reaction member of the gearing. It is contemplated that both sets of rollers shall be operative for a two-way reduced speed ratio drive through the gearing and that the cage for the rollers shall be so controlled as to render one of the roller sets inoperative for a direct drive through the transmission. The roller cage is preferably so controlled by means of a lost motion connection in order that the other set of rollers may be immediately operative when a downshift is made from direct drive to a reduced drive.

The invention consists of the novel constructions, arrangements and devices to be hereinafter described and claimed for carrying out the above stated objects and such other objects as will appear from the following description of a certain preferred embodiment illustrated in the accompanying drawings, wherein:

Fig. 2 is a sectional view taken on line 2—2 of Fig. 1; and

Figs. 3 and 4 are sectional views similar to Fig. 2 but with the illustrated parts being in different relative positions.

Like characters of reference designate like parts in the several views.

Figure 1:
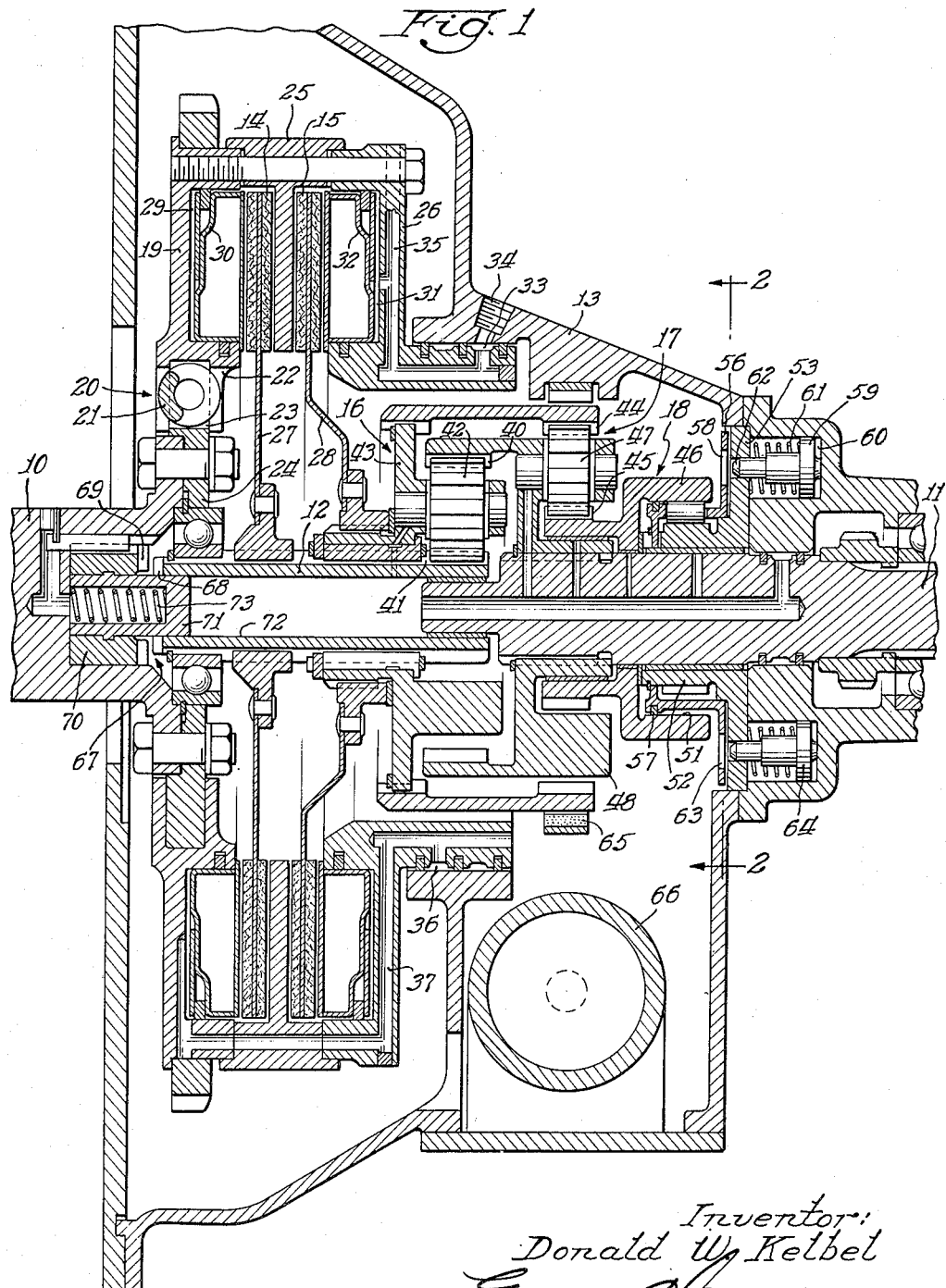
Fig. 1 is a longitudinal sectional view of a transmission embodying the principles of the invention.

Referring now in particular to Fig. 1 of the drawings, it will be observed that the illustrated transmission comprises a driving shaft 10, a driven shaft 11 and an intermediate shaft 12 which is piloted with respect to both the shafts 10 and 11. The shafts are rotatably disposed within a transmission casing 13 as shown. The transmission comprises two engine clutches 14 and 15 which are connected to various parts of two planetary gear sets 16 and 17 for providing various drives through the transmission. The transmission comprises also braking mechanism 18 for a reaction element of the planetary gear sets in order to provide various reduced ratio drives through the transmission, as will be hereinafter more fully described.

An engine flywheel 19 is connected to the drive shaft 10 by means of a vibration dampener 20 which is used in the illustrated transmission in lieu of a vibration dampener for each of the clutches 14 and 15. The dampener comprises a plurality of springs 21 retained between spaced lugs 22 on the flywheel 19 and tongues 23 on a hub member 24 bolted to the drive shaft 10.

The clutch assembly comprises a reaction plate 25 and an annular casting 26 bolted to the flywheel 19. A clutch disc 27 for the clutch 14 is disposed between the flywheel 19 and the reaction plate 25, and a clutch disc 28 for the clutch 15 is disposed between the reaction plate 25 and the annular casting 26. The flywheel 19 is provided with an annular chamber 29 in which an annular piston 30 is slidably disposed, and the annular casting 26 is provided with a similar annular chamber 31 in which an annular piston 32 is slidably disposed.

The annular casting 26 is provided with an oil collecting groove 33 which is in communication with an oil inlet opening 34 in the housing 13 and with an oil duct 35 in the casting 26. The duct 35 is in communication with the chamber 31, and oil under pressure may be admitted into the chamber to act on the piston 32 through the housing opening 34 and duct 35. Such application of fluid pressure to the piston 32 has the effect of engaging the clutch 15 by clamping the clutch disc 28 between the piston 32 and the reaction plate 25. The annular casting 26 has another oil collecting groove 36 which is in communication with an opening (not shown) in the housing 13 similar to the opening 34, and the groove 36 is in communication with a duct 37 in the casting 26 and plate 25 which in turn is in communication with the annular chamber 29 in the flywheel 19. The clutch 14 may be applied similarly to the clutch 15 by application of fluid pressure to the collector groove 36 and thereby to the annular piston 30 which clamps the disc 27 between itself and the reaction member 25.

The planetary gear set 16 comprises a ring gear 40, a sun gear 41 cut on the intermediate shaft 12, a plurality of planet gears 42 in mesh with the gears 40 and 41 and a planet gear carrier 43 for the gears 42. The planetary gear set 17 comprises a ring gear 44, a sun gear 45 formed on a reaction member 46 for the planetary gear set, a plurality of planet gears 47 and a planet gear carrier 48 for the gears 47. It will be noted that the clutch disc 28 is splined to the planet gear carrier 43 and that the carrier 43 is rotatably disposed on the intermediate shaft 12 and is connected to the ring gear 44 of the gear set 17. The clutch disc 27 is splined to the intermediate shaft 12 and is thereby connected directly to the sun gear 41. The ring gear 40 of the gear set 16 is connected with the planet gear carrier 48 of the gear set 17, and the ring gear and gear carrier may indeed constitute a single part. The gear carrier 48 is splined to the driven shaft 11, as shown.

The brake mechanism 18 is effective on the reaction member 46 and comprises one set of rollers 49 and another set of rollers 50 (see Fig. 2). The rollers 49 and 50 are disposed between a cylindrical internal surface 51 formed on the reaction member 46 and the hub portion 52 of a member 53 which is fixed within the casing 13. The hub portion 52 is formed with oppositely facing cams 54 and 55, with the rollers 50 being adapted to cooperate with the cams 54 and the rollers 49 with the cams 55. The rollers 50 are adapted to wedge between the cams 54 and the cylindrical surface 51 to prevent a rotation of the reaction member 46 in a clockwise direction as seen in Fig. 2, and the rollers 49 are adapted to wedge between the cams 55 and the cylindrical surface 51 to prevent a rotation of the reaction member 46 in a counterclockwise direction as seen in Fig. 3.

A cage 56 is provided for the rollers 49 and 50, the cage 56 having a series of perforations or openings therethrough, one for each roller, for receiving the rollers, as shown. The cage thus functions to keep the rollers 49 and 50 equidistant from each other and to assure that each of the sets of rollers act similarly with respect to their respective cams at the same time. The cage 56 has a portion 57 in frictional contact with the cylindrical surface 51 of the reaction member 46, and the cage is thus urged to rotate in the same direction as the reaction member 46. With the cage 56 having its motion unrestricted by any other means than the rollers 49 and 50, the frictional contact of the cage with the reaction member 46 causes the cage to move clockwise (see Fig. 2) if the direction of rotation of the reaction member is also clockwise, and this causes a wedging of the rollers 50 between the cams 54 and the cylindrical surface 51 to prevent further rotation of the reaction member 46 in this direction. Similarly a counterclockwise direction of rotation of the reaction member 46 causes a wedging of the rollers 49 between the cams 55 and the cylindrical surface 51 to prevent further such movement of the reaction member 46. Thus it will be apparent that allowing the cage 56 and thereby the rollers 49 and 50 unrestricted movement causes in effect a two-way braking of the reaction member 46, preventing a rotation of the reaction member 46 in either direction.

The roller cage 56 may be so controlled as to render one or the other of the sets of rollers 49 and 50 ineffective. The cage is provided with an opening 58 adapted to receive the end of a piston 59 therein. The piston 59 is disposed in a cylindrical cavity 60 in the housing 13 and is adapted to be moved toward the cage 56 and the opening 58 by means of fluid pressure exerted on one side of the piston, and a spring 61 is provided for moving the piston in the opposite direction. The end of the piston 59 is chamfered at 62, as shown, in order to effect rotative movement of the cage 56 when fluid pressure is applied behind the piston, if such movement is necessary to align the opening 58 in the cage with the piston. It will be noted that the opening 58 is larger in diameter than the piston 59, and the piston 59 extending into the opening 58 thus connects the cage 56 and the casing 13 with a lost motion connection. With the piston 59 extending into the opening 58, the cage 56 may have such movement as to permit a wedging of the rollers 50 between the cams 54 and the cylindrical surface 51 to prevent a clockwise rotation of the reaction member 46, but the cage cannot move sufficiently in the opposite direction so that the rollers 49 may be effective to wedge between the cams 55 and the cylindrical surface 51. A free rotation of the reaction member 46 in the counterclockwise direction is thus permitted with the piston 59 extending into the opening 58.

The cage 56 is provided with another opening 63 therethrough with which a piston 64 is adapted to cooperate. The piston 64 is similar to the piston 59 and cooperates with the opening 63 in the cage in the same manner as the piston 59 cooperates with the opening 58. The piston 64 and the corresponding opening 63 in the cage are, however, so disposed as to limit the movement of the cage so that the rollers 49 may be effective to wedge between the cams 55 and the cylindrical surface 51 to prevent a counterclockwise rotation of the reaction member 46 while the piston 64 prevents sufficient movement of the cage 56 so that the rollers 50 cannot wedge between the cams 54 and the cylindrical surface 51, and the reaction member 46 may freely rotate in the clockwise direction.

A friction brake 65 is provided for the ring gear 44, and this brake may be actuated by any suitable brake actuator, such as by a fluid pressure operated motor 66. The brake 65 is provided for completing a reverse drive through the transmission, as will be described.

A one-way coupling device 67 is provided between the intermediate shaft 12 and the drive shaft 10 in order to allow an internal combustion engine (not shown) which may be connected to the drive shaft 10 to be started by driving the driven shaft 11, as by pushing the automotive vehicle in which the transmission is installed, without an engagement of either of the friction clutches 14 or 15. This one-way coupling device 67 comprises ratchet teeth 68 formed on the end of the intermediate shaft 12 and ratchet teeth 69 formed on a ring 70 which is splined within the shaft 10. A piston 71 is fixed to the ring 70 and is slidably disposed in a cylindrical cavity 72 in the intermediate shaft 12. The piston 71 has a spring 73 disposed therein and acting between the shaft 10 and the piston, and the piston is also adapted to be acted on by fluid pressure within the cavity 72, as will be apparent from an inspection of the construction. Fluid pressure within the cavity 72 which may be provided by suitable fluid pressure producing mechanism connected with the motor (not shown) of the vehicle causes the piston to move against the spring 73 to its position in which it is shown with the teeth 67 and 69 being out of engagement. If, however, the motor should be out of operation, there would be no fluid pressure within the cavity 72 resulting from operation of the motor, and in this case the spring 73 is effective to move the ring 70 to interengage the teeth 69 with the teeth 68. This engagement of the teeth 69 and 68 effectively connects the shaft 12 with the shaft 10, rendering an engagement of either of the clutches 14 or 15 unnecessary in order to provide a connection between the shafts 10 and 11.

The illustrated transmission functions to provide low, intermediate and direct forward drives through the transmission and also a drive in reverse. The transmission also has a neutral condition for effectively disconnecting the driven shaft 11 from the drive shaft 10. For low and intermediate forward drives, the pistons 59 and 64 are out of interengagement with the cage 56, leaving the cage free to move in accordance with the direction of rotation of the reaction member 46. For low speed forward drive, the friction clutch 14 is engaged, and the drive is then from the shaft 10 through the flywheel 19, the clutch 14, the intermediate shaft 12, the two planet gear sets 16 and 17 to the driven shaft 11. The reaction member 46 is effective to provide the reaction point for the planet gear sets, and the brake mechanism 18 is effective to hold the reaction member 46 stationary. Both of the sets of rollers 49 and 50 may be effective, and a positive drive is thus effective either from the drive shaft 10 through the driven shaft 11 or from the driven shaft 11 to the drive shaft 10 as when the vehicle is coasting. When the drive shaft is driving, the reaction member 46 tends to rotate in the clockwise direction, and the brake mechanism 18 is in the condition in which it is illustrated in Fig. 2 with the rollers 50 preventing such rotation of the reaction member.

For intermediate forward speed drive, the clutch 14 is disengaged and the clutch 15 is engaged. The drive in this speed ratio is from the drive shaft 10 through the flywheel 19, the clutch 15, the planet gear carrier 43 and the planet gear set 17 to the driven shaft 11. The brake mechanism 18 is effective to hold the reaction member 46 stationary in this speed ratio in the same manner as in low speed ratio.

For direct drive, both of the clutches 14 and 15 are engaged, and this has the effect of locking up the two planet gear sets 16 and 17 so that all of their parts rotate at the same speed and in the same direction as the drive shaft 10, and the shaft 11 is driven in the same manner as are the parts of the gear set. In this speed ratio, the piston 59 is made effective by application of fluid pressure to its rear surface, and the piston interengages with the opening 58 in the cage 56. The reaction member 46 rotates in the counterclockwise direction as seen in Fig. 3, and the piston is effective to prevent wedging of the rollers 49 between the cams 55 and the cylindrical surface 51, so that the brake mechanism for this direction of rotation of the reaction member 46 is in neutral condition.

In order to downshift the transmission from direct drive to intermediate speed drive, it is simply necessary to release the clutch 15 and the transmission is immediately in intermediate speed ratio. This is due to the lost motion connection between the piston 59 and the cage 56 allowing the rollers 50 to become immediately effective to prevent a clockwise rotation of the reaction member 46 as seen in Fig. 2. If it is desired to make this intermediate drive a positive drive for both driving and coast conditions, it is simply necessary to withdraw fluid pressure from the piston 59 allowing the spring 61 to become effective to withdraw the piston 59 from the opening 58 in the cage 56.

For reverse drive, the clutch 14 is engaged and the brake 65 is engaged. The drive in reverse is from the drive shaft 10 through the flywheel 19, clutch 14, intermediate shaft 12, planet gear set 16 and planet gear carrier 43 to the driven shaft 11. The reaction for reverse drive is taken by the reverse brake 65, and it is thus necessary that the brake mechanism 18 for the reaction member 46 be disengaged. The piston 64 is engaged with the cage 56 for performing this function, and the piston 64 holds the cage to prevent a wedging of the rollers 50 between the cams 54 and the cylindrical surface 51, the direction of rotation of the reaction member 46 being in the clockwise direction as seen in Fig. 4.

If the motor for driving the drive shaft 10 is inoperative and it is desired to drive the motor for the purpose of starting it, the shaft 11 is driven as by pushing the vehicle, and the ring 70 is in engaged position meshing the teeth 69 and 68 to provide a drive from the shaft 11 to the shaft 10. The clutch 67, it will be noted, is in parallel with the clutch 14, and the clutch 67 thus completes the low speed power train through the transmission from the shaft 11 to the shaft 10. Both of the pistons 59 and 64 are in their illustrated positions out of engagement with the cage 56, and the brake mechanism 18 is thus effective to hold the reaction member 46 stationary to provide a reaction point for the planetary gearing. Since the motor is not in operation, there is no fluid pressure within the cavity 72 in the shaft 12 to be effective against the action of the spring 73, as will be readily understood.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In transmission mechanism, the combination of a drive shaft, a driven shaft, gearing for providing a power train between said shafts including a reaction member for completing the power train when braked, braking mechanism for said reaction member, said mechanism being self-engaging simultaneously for either direction of transmission of power from said drive shaft to said driven shaft or vice versa and having a neutral condition, means for selectively limiting the braking mechanism to engage for only one of said directions of transmission of power and keeping it in its neutral condition for the other direction, and means for selectively limiting the braking mechanism to engage for only said other direction of transmission of power and keeping it in its neutral condition for said one direction of transmission of power.

2. In transmission mechanism, the combination of a drive shaft, a driven shaft, gearing for providing a reduced speed power train between said shafts, and including a reaction member for completing the power train when braked, braking mechanism for said reaction member, said mechanism being self-engaging for either direction of transmission of power from said drive shaft to said driven shaft or vice versa and having a neutral condition, and means providing a higher speed ratio power train between said shafts and including means for selectively holding said braking mechanism in its neutral condition when said higher speed power train is effective.

3. In transmission mechanism, the combination of a drive shaft, a driven shaft, gearing for providing a reduced speed power train between said shafts and including a reaction member for completing the power train when braked, braking mechanism for said reaction member, said mechanism being self-engaging for either direction of transmission of power from said drive shaft to said driven shaft or vice versa and having a neutral condition, and means for selectively providing a one-to-one speed ratio power train between said shafts which tends to cause the same engagement of said braking mechanism as would be caused by a drive through said gearing from said driven shaft to said drive shaft and including means for simultaneously holding said braking mechanism in its neutral condition when the one-to-one speed ratio power train is effective.

4. In transmission mechanism, the combination of a drive shaft, a driven shaft, gearing for providing a reduced drive power train between said shafts and including a reaction member for completing the power train for both directions of transmission of power from said drive shaft to said driven shaft when braked, braking means for said reaction member, said braking means comprising a one-way roller clutch mechanism for each of said directions of transmission of power and having a neutral condition, and means for selectively providing a one-to-one speed ratio power train between said shafts, said one-to-one power train tending to cause the same engagement of said braking means as is caused by a drive from said driven shaft to said drive shaft through said gearing, said means for selectively providing said one-to-one speed ratio power train including means for holding said braking means in its neutral condition during the completion of the one-to-one power train.

5. In transmission mechanism, the combination of a drive shaft, a driven shaft, gearing for providing a reduced drive power train between said shafts and including a reaction member, braking mechanism for said reaction member for completing said power train, said braking mechanism comprising two oppositely acting one-way clutch mechanisms which are self-engaging for either direction of transmission of power from said drive shaft to said driven shaft or vice versa and having a neutral condition, means for selectively providing a one-to-one speed ratio power train between said shafts, said one-to-one power train tending to cause engagement of the same one-way clutch mechanism which is engaged for a transmission of power from said driven shaft to said drive shaft through said gearing, and selectively operable means for holding said last named one-way clutch mechanism disengaged for the one-to-one speed ratio power train.

6. In transmission mechanism, the combination of a drive shaft, a driven shaft, gearing for providing a reduced speed ratio power train between said shafts and comprising a reaction member, a brake for said reaction member for completing said power train, said brake comprising two oppositely acting one-way clutch mechanisms which are self-engaging for both directions of transmission of power from said drive shaft to said driven shaft or vice versa and having a neutral condition, means for selectively providing a one-to-one drive between said shafts, said one-to-one power train tending to cause an engagement of the one-way clutch mechanism which would be engaged for a drive from said driven shaft to said drive shaft through said gearing, and selectively operable means for preventing said last named clutch mechanism from engaging but allowing the other clutch mechanism to engage for the one-to-one speed ratio power train.

7. In transmission mechanism, the combination of a drive shaft, a driven shaft, gearing for providing a low speed power train between said shafts, a brake for completing said power train and comprising two parts adapted to engage with respect to each other, said brake including two sets of rollers one of which engages the parts for one relative direction of rotation of the parts and other of which engages the said parts for the other relative direction of rotation of the parts, said brake being capable of assuming a neutral condition, means for selectively providing a higher speed power train between said shafts, and selectively operable means for holding said brake in its neutral condition with neither of said sets of rollers being engaged for the higher speed power train.

8. In transmission mechanism, the combination of a drive shaft, a driven shaft, gearing for providing a reduced drive power train between said shafts, a brake for completing said power train and comprising two parts adapted to engage with respect to each other, said brake including two sets of rollers of which one engages the parts for one relative direction of rotation of the parts and the other of which engages said parts for the other relative direction of rotation of parts and brake being capable of assuming a neutral condition, means for selectively providing a one-to-one speed ratio power train between said shafts, said one-to-one power train tending to cause engagement of the set of rollers which would be engaged by a drive from said driven shaft to said drive shaft through said gearing, a cage for said rollers for controlling the same, and means for limiting the movement of said cage and thereby of said rollers whereby to prevent engagement of said last named set of rollers when said one-to-one speed ratio is effective through the transmission.

9. In transmission mechanism, the combination of a drive shaft, a driven shaft, gearing for providing a reduced speed ratio power train between said shafts and having a reaction member, a brake for said reaction member for completing said power train, said brake comprising two sets of rollers one of which engages for preventing movement of said reaction member in one direction and the other of which engages for preventing rotation of the reaction member in the other direction, a cage for said rollers for controlling the same, means for selectively providing a one-to-one speed ratio power train between said shafts, and means for selectively controlling the movement of said cage and thereby of said rollers and including a lost motion connection with the cage selectively made operative for preventing one of said sets of rollers from engaging to brake said reaction member whereby to allow said one-to-one power train between said shafts but allowing the other set of rollers to engage.

10. In transmission mechanism, the combination of a drive shaft, a driven shaft, gearing for providing a two-way forward drive power train between said shafts and including a reaction member for completing the power train when braked, braking mechanism for said reaction member, said braking mechanism being self engaging simultaneously for either direction of transmission of power from said drive shaft to said driven shaft and having a neutral condition, and clutch means for providing a second two-way forward drive power train between said shafts and including means enabling the completion of said second two-way drive power train and for selectively keeping the braking mechanism in neutral condition in either direction of transmission of power between said shafts, whereby the braking mechanism is disengaged when said second two-way forward drive power train is completed.

11. In transmission mechanism, the combination of a drive shaft, a driven shaft, gearing for providing a two-way forward drive power train between said shafts and including a reaction member for completing the power train when braked, braking mechanism for said reaction member, said braking mechanism being self engaging simultaneously for either direction of transmission of power from said drive shaft to said driven shaft and having a neutral condition, and clutch means for providing a reverse drive power train between said shafts and including means for selectively keeping the brake mechanism in neutral condition in either direction of transmission of power between said shafts whereby the braking mechanism is disengaged when said reverse drive power train is completed.

DONALD W. KELBEL.

REFERENCES CITED

The following references are of record in the file of this patent:

UNITED STATES PATENTS

| Number | Name | Date |
| --- | --- | --- |
| 1,718,074 | Reece | June 18, 1929 |
| 1,823,389 | DeLavaud | Sept. 15, 1931 |
| 1,865,910 | Hobbs | July 5, 1932 |
| 1,942,197 | Blackstock | Jan. 2, 1934 |
| 1,978,416 | Dodge | Oct. 30, 1934 |
| 2,209,695 | Heinze | July 30, 1940 |
| 2,353,905 | Kelley | July 18, 1944 |
| 2,388,700 | Morrill | Nov. 13, 1945 |
| 2,395,459 | Carnagua | Feb. 26, 1946 |